(12) United States Patent
Näslund et al.

(10) Patent No.: US 9,992,017 B2
(45) Date of Patent: Jun. 5, 2018

(54) ENCRYPTING AND STORING DATA

(71) Applicant: TELEFONAKTIEBOLAGET L M ERICSSON (PUBL), Stockholm (SE)

(72) Inventors: Mats Näslund, Bromma (SE); Tereza Cristina Melo De Brito Carvalho, São Paulo (BR); Leonardo Horn Iwaya, São Paulo (BR); Marcos Antonio Simplicio Junior, São Paulo (BR)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 122 days.

(21) Appl. No.: 14/900,557

(22) PCT Filed: Jun. 28, 2013

(86) PCT No.: PCT/SE2013/050823
§ 371 (c)(1),
(2) Date: Dec. 21, 2015

(87) PCT Pub. No.: WO2014/209190
PCT Pub. Date: Dec. 31, 2014

(65) Prior Publication Data
US 2016/0156464 A1    Jun. 2, 2016

(51) Int. Cl.
*H04L 29/06* (2006.01)
*H04L 9/08* (2006.01)
(Continued)

(52) U.S. Cl.
CPC ............ *H04L 9/0822* (2013.01); *H04L 9/088* (2013.01); *H04L 9/0838* (2013.01);
(Continued)

(58) Field of Classification Search
CPC . H04L 2209/24; H04L 63/061; H04L 9/0822; H04L 9/0838; H04L 9/0861; H04L 9/088; H04L 9/0894; H04L 9/14
See application file for complete search history.

(56) References Cited

U.S. PATENT DOCUMENTS 6,044,155 A * 3/2000 Thomlinson ........ G06F 21/6245
380/277
6,718,467 B1 * 4/2004 Trostle .................. H04L 9/0844
380/281

(Continued)

FOREIGN PATENT DOCUMENTS

WO    WO 2013/040046 A1    3/2013

OTHER PUBLICATIONS

Kwon, Taekyoung, Young-Ho Park, and Hee Jung Lee. "Security analysis and improvement of the efficient password-based authentication protocol." IEEE Communications Letters 9.1 (2005): 93-95.*

(Continued)

*Primary Examiner* — Michael Simitoski
(74) *Attorney, Agent, or Firm* — Sage Patent Group

(57) ABSTRACT

Methods and apparatus for encrypting and storing data. The methods and apparatus provide different levels of security and usability. The methods and apparatus generate two or more keys based on a shared secret made available to a user equipment and a server. The two or more keys comprise at least one perfect forward secrecy key, and at least one limited forward secrecy key. The methods and apparatus encrypt data using at least one of the two or more keys. The methods and apparatus store the encrypted data in a memory of the user equipment and/or transmit the data from the user equipment to the server.

15 Claims, 4 Drawing Sheets

(51) Int. Cl.
   *H04L 9/14* (2006.01)
   *G06F 12/14* (2006.01)
(52) U.S. Cl.
   CPC .......... *H04L 9/0861* (2013.01); *H04L 9/0894* (2013.01); *H04L 9/14* (2013.01); *H04L 63/061* (2013.01); *H04L 2209/24* (2013.01)

(56) References Cited

U.S. PATENT DOCUMENTS

| | | | | |
|---|---|---|---|---|
| 8,751,804 B1* | 6/2014 | Nystrom | ............. | H04L 63/0428 |
| | | | | 713/168 |
| 9,191,390 B1* | 11/2015 | Ryan | ..................... | H04L 63/10 |
| 2004/0083368 A1 | 4/2004 | Gehrmann | | |
| 2005/0251680 A1* | 11/2005 | Brown | ................. | H04L 63/061 |
| | | | | 713/171 |
| 2007/0039042 A1* | 2/2007 | Apelbaum | .............. | G06F 21/46 |
| | | | | 726/6 |
| 2007/0121947 A1* | 5/2007 | Sood | ..................... | H04L 9/0836 |
| | | | | 380/277 |
| 2007/0130470 A1 | 6/2007 | Blom et al. | | |
| 2007/0250713 A1* | 10/2007 | Rahman | ............... | H04L 63/162 |
| | | | | 713/171 |
| 2008/0270724 A1* | 10/2008 | Ramesh | ............. | G06F 21/6218 |
| | | | | 711/163 |
| 2009/0217033 A1* | 8/2009 | Costa | ................... | H04L 63/08 |
| | | | | 713/155 |
| 2010/0017603 A1* | 1/2010 | Jones | ................... | H04L 9/0844 |
| | | | | 713/168 |
| 2010/0266127 A1 | 10/2010 | Rouse et al. | | |
| 2011/0252243 A1* | 10/2011 | Brouwer | .............. | H04L 9/0838 |
| | | | | 713/189 |
| 2013/0145447 A1* | 6/2013 | Maron | ................... | G06F 21/31 |
| | | | | 726/6 |
| 2013/0243194 A1* | 9/2013 | Hawkes | ................ | H04L 63/067 |
| | | | | 380/270 |
| 2013/0298209 A1* | 11/2013 | Targali | ............... | H04L 63/0815 |
| | | | | 726/6 |
| 2014/0140508 A1* | 5/2014 | Kamath | ................ | H04L 9/0822 |
| | | | | 380/255 |

OTHER PUBLICATIONS

Sui, Ai-fen, et al. "An improved authenticated key agreement protocol with perfect forward secrecy for wireless mobile communication." Wireless Communications and Networking Conference, 2005 IEEE. vol. 4. IEEE, 200r5.*

International Search Report, Application No. PCT/SE2013/050823, dated Feb. 20, 2014.

Written Opinion of the International Searching Authority, Application No. PCT/SE2013/050823, dated Feb. 20, 2014.

Bellovin et al., "Encrypted Key Exchange: Password-Based Protocols Secure Against Dictionary Attacks", *Proceedings of the IEEE Symposium on Research in Security and Privacy,* Oakland, CA, May 4-6, 1992, pp. 72-84.

Brown et al., "Forward Secrecy Extensions for Open PGP", Network Working Group, Updates: RFC 2240, Category: Internet-DRAFT, Expires Apr. 5, 2002, Oct. 2001, 8 pp.

Gejibo et al., "Secure Data Storage for Mobile Data Collection Systems", *MEDES '12—Proceedings of the International Conference on Management of Emergent Digital EcoSystems,* Addis Ababa, Ethiopia, Oct. 28-31, 2012, pp. 131-144.

Lin et al., "An Improvement on Secure E-mail protocols Providing Perfect Foward [sic] Secrecy", publication date unknown, 4 pp.

Wu, "The Secure Remote Password Protocol", *Proceedings of the 1998 Internet Society Network and Distributed System Security Symposium,* San Diego, CA, Mar. 1998, 15 pp.

* cited by examiner

ENCRYPTING AND STORING DATA

CROSS REFERENCE TO RELATED APPLICATION

This application is a 35 U.S.C. § 371 national stage application of PCT International Application No. PCT/SE2013/050823, filed on Jun. 28, 2013, the disclosure and content of which is incorporated by reference herein in its entirety. The above-referenced PCT International Application was published in the English language as International Publication No. WO 2014/209190 A1 on Dec. 31, 2014.

TECHNICAL FIELD

The invention relates to methods and apparatus for encrypting and storing data.

BACKGROUND

User authentication is an important element in modern computer security. Even though there are authentication mechanisms based on biometric devices ("what the user is") and physical devices such as smart cards ("what the user has"), the most widespread strategy still is to rely on secret passwords ("what the user knows"). This is because password-based authentication is well-known to users, simple, cost effective and efficient. Whether this is right or wrong, the advantages of password-based authentication in practice tend to out-shadow any disadvantages, for example, those related to the problems of choosing strong, yet easy-to-remember passwords. Thus, it is likely that password-based authentication will be used for quite some time into the future.

Typical password-based systems employ key derivation functions (KDF). These are cryptographic algorithms that allow the generation of a pseudorandom string of bits from the password itself. Typically, the output of a KDF is employed in one of two manners: it can be locally stored in the form of a "token" for future verifications of the password, or it can be used as the secret key for data encryption and/or authentication. Whichever the case, such solutions employ, internally, a one-way function (e.g., a hash function), so that recovering the password from the key derivation's output is computationally unfeasible. Nonetheless, an attacker can still use so-called "dictionary attacks", in which many different passwords are tried until a match is found.

Key derivation functions usually rely on two basic strategies for preventing such brute-force attacks. The first is purposely to raise the computational cost of every password guess, such as processing time and/or memory usage. The second is to take as input not only the user-memorisable password, but also a sequence of random bits known as a "salt". The presence of such random variable thwarts several attacks based on pre-build tables of common passwords, i.e., the attacker is forced to create a new table from scratch for every different salt. The salt can thus be seen as an index into a large set of possible keys derived from the password, and need not to be memorized by the user or kept secret.

Data delivery to remote locations typically employs password authenticated key exchange (PAKE) protocols. Such schemes allow two or more parties who share a shared secret, such as a password or information derived from a password, to authenticate each other and create a secure channel for protecting their communications. In order to be considered secure, PAKE solutions should ensure that an unauthorized party (one who controls the communication channel but has no access to the password) is unable to learn the resulting key and is, as much as possible, unable to guess the password using offline brute force attacks.

The security of a computer system commonly depends on the condition that attackers cannot gain access to its underlying secret (e.g., a password). In practice, however, ensuring that this condition is met is a difficult challenge. In addition, most strategies employed for hindering the exposure of the secret keys end-up raising the costs, and may not be adequate for use in all scenarios. Examples include the use of special devices (e.g., smart-cards) and multiple factor mechanisms (e.g., regular passwords combined with smart-cards and/or biometric readings). Therefore, a sufficiently motivated attacker may succeed in exposing a system's secrets (e.g., by stealing and directly accessing a device's storage unit).

It is possible to build password-based protocols having so-called "perfect forward security" (also called perfect forward secrecy). In the case of PAKE schemes, this property can be translated as follows: if long-term secret information (e.g., the password) is revealed to an attacker, this information cannot be used to obtain keys (and access encrypted information) from past communications. This effectively protects all information previously exchanged. In other words, if the parties participating in the protocol share a long-term secret S and run the protocol r times before the password S is discovered by an attacker, that attacker is unable to determine the set of ephemeral keys $\{K1, \ldots, Kr\}$ generated prior to this disclosure of S. Only the subsequent keys $Kr+i$ ($i>0$) generated using the same password S can be compromised by that attacker.

This concept is an integral part of many modern security solutions, including pseudo-random generators, digital signatures and public key encryption. It is usually employed for securing data channels between communicating parties during a limited/temporal interaction. Nonetheless, it is also possible to employ the perfect forward secrecy concept to the context of secure data storage, avoiding the encryption of large quantities of data with a single secret key. A drawback of applying forward secrecy is that such strategy incurs additional operations and, most likely, a more complex key management/evolving scheme. In addition, perfect forward secrecy schemes store data such that it is not accessible (e.g. for further update/edit) even by an authorised user, as even knowledge of the password must not allow access to the stored data.

Unlike PAKE schemes, KDF schemes allow a user to be authenticated toward a device without the need of contacting a remote entity. On the other hand, KDFs are unable to prevent offline dictionary attacks if the underlying salt is discovered, in particular, if the salt is sent to a remote location during data delivery, or if an attacker accesses a device's memory. Even some forward secure PAKE schemes are vulnerable to physical attacks, in which an adversary simply steals the device in which the keys are kept in memory and then recovers the password-protected data without discovering the password itself. This is a particularly serious threat when we consider applications in which users cannot renew their keys very often due to limited connectivity with their counterparts (e.g., if a mobile device has limited connectivity to a network and, therefore, to a server at which it wishes to store data). This is the case in so-called Delay/Disruption Tolerant Networks (DTN).

In DTNs, user equipments are obliged to (1) store the session key in volatile memory for a long time and/or (2) store the session key in non-volatile memory, retrieving it whenever necessary (e.g., when an application is run). One example of a real-world application with such connectivity issues is a data collection system deployed in remote areas, such as those in which health care workers visit families' homes in areas with poor/unstable cellular/broadband coverage. Such areas unfortunately often also make for high-risk regions, e.g., economically poor areas where mobile devices are highly attractive for theft.

SUMMARY

It is an object to alleviate at least some of the above mentioned disadvantages and provide improved security and usability for data encrypted and stored by a user equipment.

According to the invention in a first aspect, there is provided a user equipment for encrypting and storing data. The user equipment comprises a key generator configured to generate two or more keys based on a shared secret made available to the user equipment and a server. The two or more keys comprise at least one perfect forward secrecy key, and at least one limited forward secrecy key. The user equipment further comprises a data encryptor configured to encrypt data using at least one of the two or more keys. The user equipment further comprises a data recorder configured to store the encrypted data in a first memory.

The keys offer different levels of security and usability and this allows a user to select an appropriate level of each for a given scenario. The shared secret may be made available to the user equipment by being known to the user equipment. That is, the shared secret may be stored in a memory of the user equipment. The shared secret may be deleted from the memory of the user equipment after one or more of the keys are generated.

Optionally, the key generator is configured to generate a master key based on the shared secret.

Optionally, the key generator is further configured to generate a salt, and to generate the master key based on the shared secret and the salt.

Optionally, the at least one limited forward secrecy key comprises a no forward secrecy key.

Optionally, the key generator is configured to generate the no forward secrecy key based on a one-way function of the master key.

Optionally, the data recorder is configured to store the no forward secrecy key at a second memory.

Optionally, the at least one limited forward secrecy key comprises a partial forward secrecy key.

Optionally, the key generator is configured to generate the partial forward secrecy key based on a one-way function of the master key and a session identifier.

Optionally, the key generator is configured to generate the session identifier.

Optionally, after the partial forward secrecy key has been used to encrypt data, the key generator is configured to apply a one-way function to the partial forward secrecy key and session identifier to generate an updated partial forward secrecy key, and the data recorder is configured to store the updated partial forward secrecy key in a second memory.

Optionally, the key generator is configured to generate the perfect forward secrecy key by applying a one-way function on the master key and a seed value received by a receiver from the server.

Optionally, the data recorder is configured to delete the seed value from the first memory and/or the second memory after the perfect forward secrecy key has been generated.

Optionally, after the perfect forward secrecy key has been used to encrypt data, the key generator is configured to apply the one-way function to the perfect forward secrecy key to generate an updated perfect forward secrecy encryption key, and the data recorder is configured to store the subsequent perfect forward secrecy key in a second memory.

Optionally, the data encryptor is configured to encrypt the subsequent perfect forward secrecy key with the no forward secrecy key before the data recorder stores the subsequent perfect forward secrecy key.

Optionally, the user equipment further comprises a transmitter configured to transmit the stored encrypted data to a server.

Optionally, the transmitter is further configured to transmit the salt to the server.

Optionally, the transmitter is further configured to transmit the session identifier to the server.

Optionally, the data encryptor is configured to select at least one of the two or more keys to encrypt the data based on a user input.

According to the invention in a second aspect, there is provided a method of operating a user equipment. The method comprises generating by a key generator, two or more keys based on a shared secret known to the user equipment and a server. The two or more keys comprise at least one perfect forward secrecy key, and at least one limited forward secrecy key. The method further comprises encrypting data by a data encryptor using at least one of the two or more keys. The method further comprises storing the encrypted data at a memory by a data recorder.

Optionally, the method further comprises the key generator generating a master key based on the shared secret.

Optionally the method further comprises the key generator generating a salt, and generating the master key based on the shared secret and the salt.

Optionally, the at least one limited forward secrecy key comprises a no forward secrecy key.

Optionally, the method further comprises the key generator generating the no forward secrecy key based on a one-way function of the master key.

Optionally, the method further comprises the data recorder storing the no forward secrecy key at a second memory.

Optionally, the at least one limited forward secrecy key comprises a partial forward secrecy key.

Optionally, the method further comprises the key generator generating the partial forward secrecy key based on a one-way function of the master key and a session identifier.

Optionally, the method further comprises the key generator generating the session identifier.

Optionally, the method further comprises, after the partial forward secrecy key has been used to encrypt data, the key generator applying a one-way function to the partial forward secrecy key and the session identifier to generate an updated partial forward secrecy key, and the data recorder storing the updated partial forward secrecy key in a second memory.

Optionally, the method further comprises the key generator generating the perfect forward secrecy key by applying a one-way function on the master key and a seed value received by a receiver from the server.

Optionally, the method further comprises the data recorder deleting the seed value from the first memory and/or the second memory after the perfect forward secrecy key has been generated.

Optionally, the method further comprises, after the perfect forward secrecy key has been used to encrypt data, the key generator applying the one-way function to the perfect forward secrecy key to generate an updated perfect forward secrecy encryption key, and the data recorder is configured to store the subsequent perfect forward secrecy key in a second memory.

Optionally, the method further comprises the data encryptor encrypting the subsequent perfect forward secrecy key with the no forward secrecy key before the data recorder stores the subsequent perfect forward secrecy key.

Optionally, the method further comprises a transmitter transmitting the stored encrypted data to a server.

Optionally, the method further comprises the transmitter transmitting the salt to the server.

Optionally, the method further comprises the transmitter transmitting the session identifier to the server.

Optionally, the method further comprises the data encryptor selecting at least one of the two or more keys to encrypt the data based on a user input.

According to the invention in a third aspect, there is provided a non-transitory computer readable medium comprising computer readable code configured, when read by a computer, to carry out any of the above methods.

According to the invention in a fourth aspect, there is provided a computer program comprising computer readable code configured, when read by a computer, to carry out any of the above methods.

According to the invention in a fifth aspect, there is provided a server. The server comprises a receiver configured to receive encrypted data from a user equipment. The server further comprises a key generator configured to generate two or more keys based on a shared secret made available to the server and a user equipment. The two or more keys comprise at least one perfect forward secrecy key, and at least one limited forward secrecy key. The server further comprises a decryptor configured to decrypt the received encrypted data using at least one of the two or more keys. The server further comprises a data recorder configured to store at least part of the decrypted data in a memory.

Optionally, the key generator is configured to generate a master key based on the shared secret. Optionally, the key generator is further configured to generate the perfect forward secrecy key by applying a one-way function on the master key and a seed value.

Optionally, the data recorder is configured to delete the seed value from the memory after the perfect forward secrecy key has been generated.

According to the invention in a sixth aspect, there is provided a method of operating a server. The method comprises receiving by a receiver, encrypted data from a user equipment. The method further comprises generating by a key generator, two or more keys based on a shared secret made available to the server and a user equipment. The two or more keys comprise at least one perfect forward secrecy key, and at least one limited forward secrecy key. The method further comprises decrypting by a decryptor, the received encrypted data using at least one of the two or more keys. The method further comprises storing the decrypted data in a memory by a data recorder.

According to the invention in a seventh aspect, there is provided a non-transitory computer readable medium comprising computer readable code configured, when read by a computer, to carry out the above method of operating a server.

According to the invention in an eighth aspect, there is provided a computer program comprising computer readable code configured, when read by a computer, to carry out the above method of operating a server.

BRIEF DESCRIPTION OF DRAWINGS

Exemplary embodiments of the invention are described herein with reference to the accompanying drawings, in which.

DESCRIPTION

Figure 1:
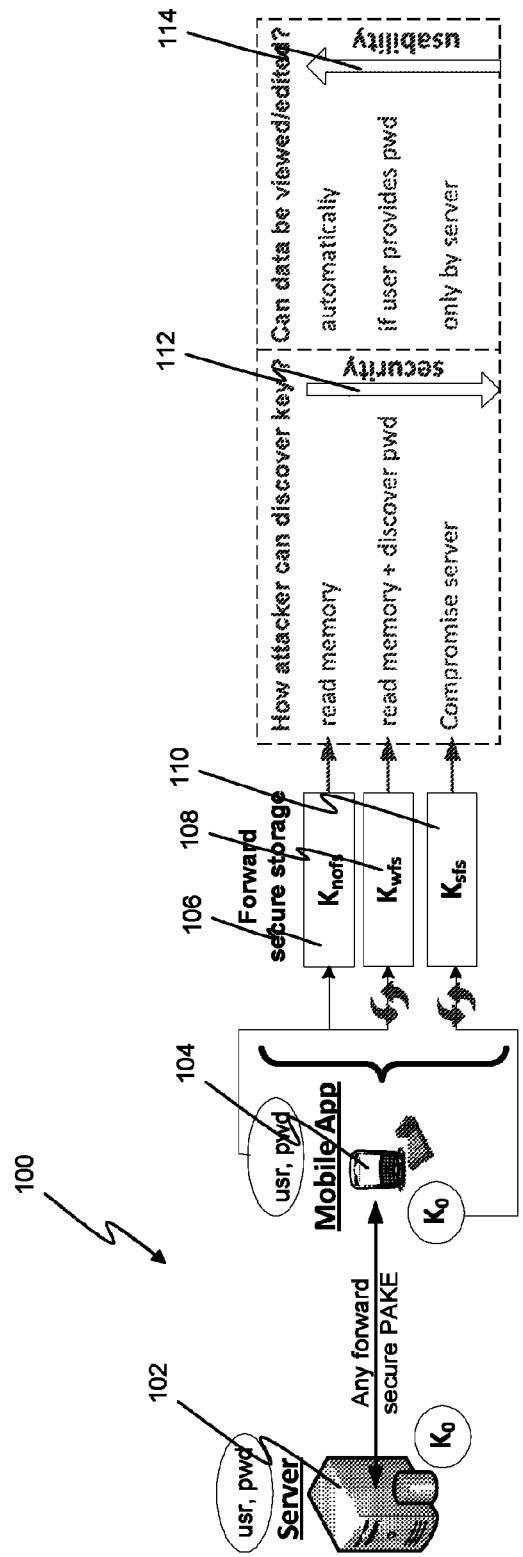
FIG. 1 is a schematic representation of a system for encrypting and storing data.

The inventors have appreciated that increased security is desirable when storing data in a user equipment before remotely delivering it to a server location but that this must be offset against the need for usability. This is particularly the case in systems where a user equipment (or client) has limited or restricted connectivity to a network and/or is in a high risk area.

It is possible to use perfect forward secrecy techniques to store data in a user equipment. However, the inventors have appreciated that, for the sake of usability, the notion of forward secrecy needs to take into account that different data chunks may need to be edited while still in the user equipment and/or be delivered to a remote server at different times. For example, a data chunk that must be frequently edited should preferably be recoverable by a system, either automatically or after the correct password is provided. By contrast, consolidated data that is ready to be delivered and remotely stored and is not required to be edited could be encrypted in such a manner that only the desired target (e.g., a server) is able to recover it. In other words, no one, whether a legitimate user or an attacker who is able to impersonate a legitimate user (e.g., by discovering that user's password and accessing the device's memory), can recover the information once it has been encrypted in the user equipment.

Further, the inventors have appreciated that in challenging geographical locations, delivery itself could interleave both types of data (e.g., due to different priorities), and can occur in "waves" due to intermittent connectivity from the user equipment.

Generally, disclosed herein are methods and apparatus for providing more than one level of security and more than one level of usability. More specifically, the methods and apparatus disclosed provide more than one key, each key allowing data to be stored with different levels of security and usability. This provides a user with an opportunity to select an appropriate level of security and usability for a given situation.

Exemplary methods and apparatus disclosed herein introduce data storage and delivery systems that combine a forward-secure PAKE protocol and a KDF as basic building blocks, to allow two entities (e.g., a client and a server) to create a set of shared secret keys for encrypting and/or decrypting data providing different security/usability tradeoffs. Each type of key is handled in a distinct manner, depending on the data requirements. In particular exemplary methods and apparatus, three types of key may be defined:

$K_{nofs}$ (no forward secrecy): this key can be created using a KDF and then kept in volatile memory while a user's session is active. By "user session" we refer to the period during which the user is "logged in" to the device, typically initiated by the user entering his/her password. Hence, data encrypted with $K_{nofs}$ can be edited without requiring the user to provide the corresponding password again. This provides greater usability, as a user is able to edit the data without additional effort. The protection provided against device capture is the fact that the key is never stored in non-volatile memory. Therefore, an attacker who steals the device while a legitimate user's session is not active cannot access data protected by the $K_{nofs}$ key. If an attacker obtains the user's password, they will be able to access all data protected by the $K_{nofs}$ key.

$K_{wfs}$ (weak (or partial) forward secrecy): this key can be created using a KDF and a session identifier, such as a locally-generated random session identifier ses, the latter being locally stored. After $K_{wfs}$ is used to encrypt a data chunk, it is processed by a one-way (e.g., hash) function. Hence, the key value actually used for encrypting each data chunk is never recoverable from the device's volatile memory, providing forward secrecy even if the device is stolen and its memory is read. Data encrypted by the $K_{wfs}$ key can be edited if the correct password is provided. Since the key can be derived from the password and ses, if an attacker, having stolen the device, also obtains a user's password, forward secrecy is not ensured.

$K_{sfs}$ (strong (or perfect) forward secrecy): this key can be created (optionally, only once) using a PAKE scheme. Like $K_{wfs}$, $K_{sfs}$ is also processed by a one-way (e.g., hash) function after use, providing forward secrecy against attackers who access the device's memory. In addition, since the information required for computing the original $K_{sfs}$ is not stored in the device (only at a remote location, such as a server), this key also provides forward secrecy against password-recovery. The freshest (not yet used) value of $K_{sfs}$ may also be locally stored after being encrypted with $K_{nofs}$, thus allowing it to be recovered between sessions without affecting the previously-mentioned forward secrecy property. Data encrypted with this key cannot be edited, and is only recoverable by the remote site (e.g., a server).

It should be noted that a method/system/apparatus generating keys having (some form of) forward security does not imply a guarantee that generated keys can never in the future be disclosed or compromised. Rather, it is a property giving assurance that if a generated key is compromised, then previous keys generated by the method/system still have (some form of) security guarantee. Specifically, as will be explained below, the invention generally provides forwards security in two different aspects. First, forward security is provided in terms of a session concept, so that forward secrecy refers to security of key(s) used during previous session in the event of a compromise of the current session key(s). Within a session, the invention furthermore provides a forward secrecy with respect to "chunks" of data: compromise of keys used for certain chunks do not lead to compromise of keys used for previous chunks.

Systems may provide only for a key similar to $K_{nofs}$, but with the additional issue that even if the password is changed, the $K_{nofs}$ would remain the same. That is, if a random $K_{nofs}$ is encrypted with a key generated from the password then, if the password is changed, $K_{nofs}$ remains the same, as it is simply decrypted with the old password and from that point on only encrypted with the new password.

It is noted that the term "random" as used herein in the sense of number generation, encompasses the generation of any number that does not follow an easily predictable pattern. For example, a randomly generated number may be truly random, pseudo-random (i.e. generated by a pseudo-random function) or not fully random but generated by a function that is difficult to distinguish from true randomness therefore making it difficult to predict or pre-determine a next output of the function even if previous outputs are known.

FIG. 1 shows a schematic representation of a system 100 for storing encrypted data at a user equipment 104 to be transferred (possibly at a later time) to a server 102. The system comprises the server 102 and a user equipment 104 that are in electrical communication with each other, optionally over a wired or wireless network. The user equipment 104 may be a client in a client server relationship with the server 102. The user equipment 104 may be a computer device and, in particular, a mobile device, such as a mobile terminal, smartphone, tablet PC or laptop PC. Each of the three keys $K_{nofs}$ 106, $K_{wfs}$ 108 and $K_{sfs}$ 110 are represented in FIG. 1. In addition, FIG. 1 includes a table summarising the characteristics of each key 106, 108, 110. The arrow 112 shows increasing security and the arrow 114 shows increasing usability.

Figure 2:
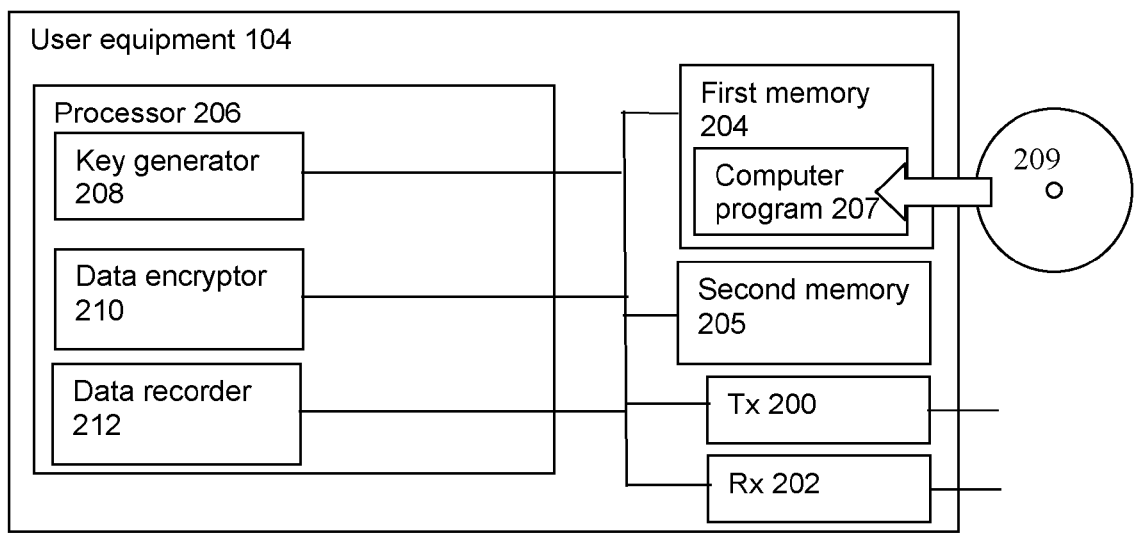
FIG. 2 is a schematic representation of a user equipment.

FIG. 2 shows a more detailed schematic representation of a user equipment 104. The user equipment 104 comprises a transmitter 200 and a receiver 202. The transmitter 200 and receiver 202 are in electrical communication with other nodes and/or functions in a computer network system and are configured to transmit and receive data therefrom. The user equipment 104 further comprises a first memory 204, a second memory 205 and a processor 206. The first memory 204 may comprise a non-volatile memory and the second memory 205 may comprise a volatile memory. The first memory 204 may have a computer program 207 stored therein. The computer program 307 may be configured to undertake the methods disclosed. The computer program may be loaded in the first memory 204 from a non-transitory computer readable medium 209 on which the computer program is stored. The processor 206 is configured to undertake the functions of a key generator 208, a data encryptor 210 and a data recorder 212. Each of the transmitter 200, receiver 202, first memory 204, second memory 205, processor 206, key generator 208, data encryptor 210 and data recorder 212 is in electrical communication with the other features 200, 202, 204, 205, 206, 208, 210, 212 of the user equipment 104. The user equipment 104 can be implemented as a combination of computer hardware and software. In particular, the key generator 208, data encryptor 210 and data recorder 212 may be implemented as software configured to run on the processor 206. The first memory 204 and second memory 205 store the various programs/executable files that are implemented by a processor 206, and also provide a storage unit for any required data. The programs/executable files stored in the first memory 204 and/or second memory 205, and implemented by the processor 206, can include the key generator 208, data encryptor 210 and data recorder 212 but are not limited to such.

Figure 3:
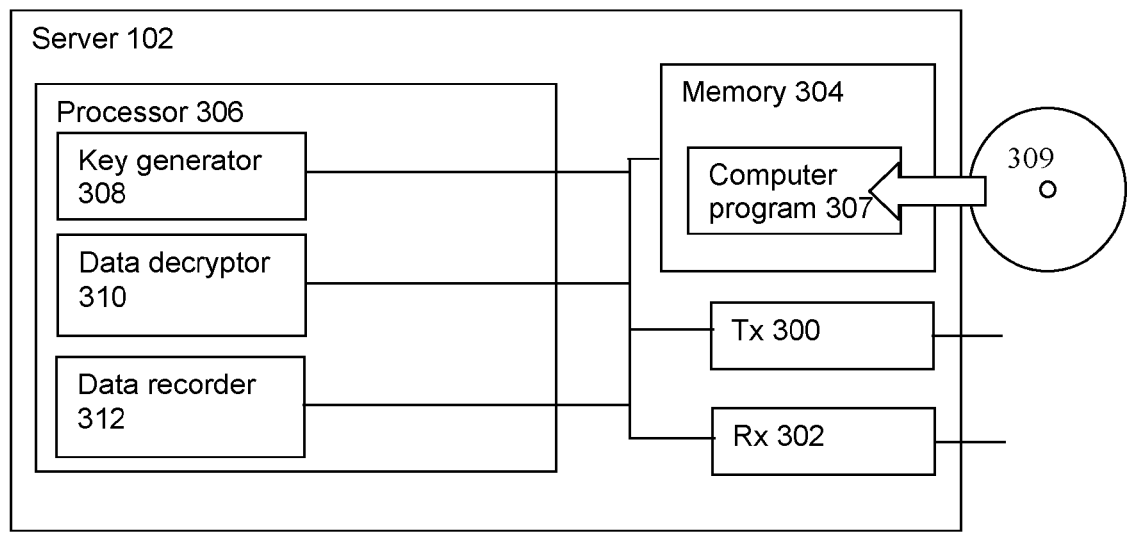
FIG. 3 is a schematic representation of a server.

FIG. 3 shows a more detailed schematic representation of a server 102. The server 102 comprises a transmitter 300 and a receiver 302. The transmitter 300 and receiver 302 are in electrical communication with other nodes and/or functions in a computer network system and are configured to transmit and receive data therefrom. The server 102 further comprises a memory 304 and a processor 306. The memory 304 may have a computer program 307 stored therein. The computer program 307 may be configured to undertake any of the methods disclosed herein. The computer program 307 may be loaded in the memory 304 from a non-transitory computer readable medium 309 on which the computer program is stored. The memory 304 may comprise a non-volatile memory. The processor 306 is configured to undertake the functions of a key generator 308, a data decryptor 310 and a data recorder 312. Each of the transmitter 300, receiver 302, memory 304, processor 306, key generator 308, data decryptor 310 and data recorder 312 is in electrical communication with the other features 300, 302, 304, 305, 306, 308, 310, 312 of the server 102. The server 102 can be implemented as a combination of computer hardware and software. In particular, the key generator 308, data decryptor 310 and data recorder 312 may be implemented as software configured to run on the processor 306. The memory 304 stores the various programs/executable files that are implemented by a processor 306, and also provide a storage unit for any required data. The programs/executable files stored in the memory 304, and implemented by the processor 306, can include the key generator 308, data decryptor 310 and data recorder 312 but are not limited to such.

In the following description of exemplary methods and apparatus, it is assumed that the user equipment 104 generates and encrypts data and the server 102 receives encrypted data. Typically, but not necessarily, the server 102 also decrypts the data. However, it is noted that the methods and apparatus disclosed are also applicable in situations in which data is passed from the server 102 to the user equipment 104.

The user's credentials for accessing the server 102 may comprise a username "usr" and a password (or some password-derived information) "pwd". The credentials are provided to legitimate users and this may be at a system manager's discretion. No specific limitation on how this is done is imposed but typically, the server 102 may keep a list of valid usr and pwd pairs.

The following notation is employed in the remainder of this document: $E_K(M)$ and $E_K^{-1}(M)$ represent, respectively, encryption and decryption of a message M under a key K; $AE_K(M)$ and $AE_K^{-1}(M)$ represent the authenticated-encryption and authenticated-decryption (i.e., the processes combining encryption/authentication and decryption/verification) of a message M under a key K. The authentication tag generated by a Message Authentication Code (MAC) for a message M under a key K is written $MAC_K(M)$. $H(M)$ represents an application of a cryptographic hash function on a message M, and $H^n(M)$ represents the iterative application of a hash function on M, n times (note that $H^0(M)=M$). Also, $H_{[s]}(M)$ denotes the application of the hash function on M after it is prefixed with an arbitrary bitstring s (i.e., $H_{[s]}(M)=H(s\|M)$). Consequently, $H_{[s]}^n(M)$ indicates that s is prefixed to the input of the hash function before each of its n applications. The symbol $|a|$ is used to indicate the length (in bits) of string a, and the symbol $\|$ is used for concatenation. Constant strings of characters are written between single quotes (e.g., 'string'). Finally, $[s]_t$ denotes the truncation of bitstring s to some predefined segment of t bits, e.g. leftmost or rightmost bits.

Session-Setup: Password Authentication and Key Exchange (PAKE)

For the purpose of generating/collecting encrypted data in the user equipment and transferring the encrypted data to the server, a session is created between the user equipment and the server. The session concept is defined by the usage of certain master key, MK as will be explained below. The decision to define a new session (and thus a new MK) could be dependent on a number of parameters, e.g., a session could be associated with a time period (e.g. one hour), by some user action defining when the session is started/terminated (e.g. launch/termination of an application), or by some other parameter. Prior to session setup, the password (or password dependent) information pwd has been made available to the user equipment 104 and server 102 e.g. by configuration of the server and user-input to the user equipment or by some other form of out of band agreement between user equipment and server. That is, pwd represents a shared secret known to the user and the server 102 and made available to the user equipment. However, it is noted that pwd may be erased from the memories 204, 205 of the user equipment after setup. Therefore, if the user should forget pwd and/or if the user is not available to provide the pwd, the data can still be decrypted by co-operation of the server 102. This may be done using known methods and is not explained in detail here.

Session setup requires the user to be authenticated online at least once. This allows the user equipment 104 and server 102 to create a shared key $K_0$, which is derived from a local and remote shared secret known to both the server 102 and a user of the user equipment 104. This can be done using a PAKE protocol providing forward secrecy, as long as it provides a key $K_0$ at the end and allows the server 102 to derive the same keys as the user equipment 104.

Figure 4:
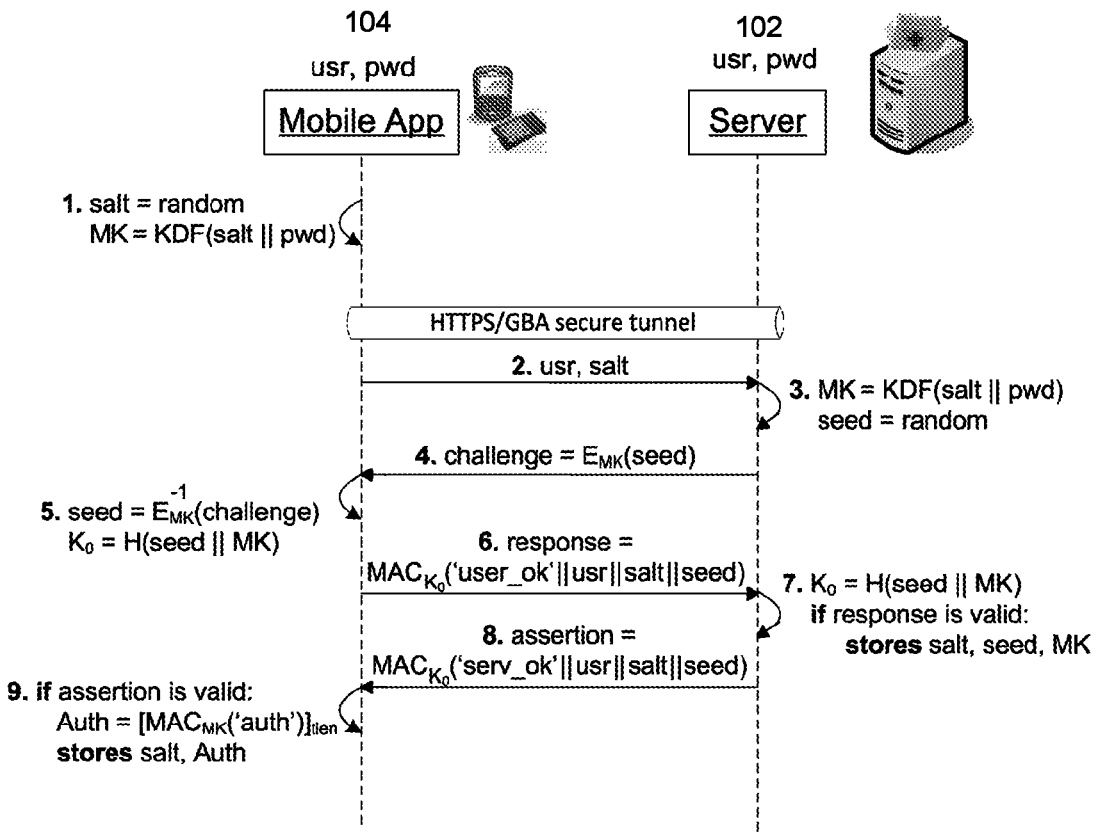
FIG. 4 is a data flow diagram of a session setup.

For reasons of clarity, an exemplary protocol is shown in FIG. 4 and described below, although other protocols may be used. Generally, the protocol corresponds to a challenge-response protocol running inside a secure tunnel, allowing both parties to be mutually authenticated by client-side (i.e., at the user equipment) and server-side secrets (e.g., salt and seed, respectively).

1. The processor 206 of the user equipment 104 generates a random salt value, which is combined with the user-provided pwd by means of a KDF. The result is a master key MK=KDF(salt$\|$pwd). The pwd itself can then be erased from the user equipment's memories 204, 205, although it remains known to the user.
2. The transmitter 200 and receiver 202 of the user equipment 104 establish a secure connection with the transmitter 300 and receiver 302 of the server 102, authenticating the server 102 and protecting the communication against eavesdropping and phishing from this point on by generating a secure tunnel. In order to do so, standard security mechanisms such as transport layer security (TLS) and/or secure sockets layer (SSL) with legitimate certificates or the generic bootstrapping architecture (GBA) can be employed. Under the protection of this tunnel, the transmitter 200 of the user equipment 104 sends to the receiver 302 of the server 102 the user identification usr together with the random salt generated in step 1.
3. The processor 306 of the server 102 computes the master key MK using pwd (which may be derived from the password provided by the user and is already known to the server 102) and creates a random seed value. The seed value plays a role in providing forward secrecy to locally stored data, as further discussed below, but during session setup, it is used to create a challenge to the user equipment 104.
4. The transmitter 300 of the server 102 transmits a challenge to the user equipment 104. The processor 306 of the server 102 encrypts the random seed with MK, so that only a user equipment 102 that can compute the same MK is able to recover the correct seed.
5. The processor 206 of the user equipment 104 decrypts the value of the seed using the previously computed MK. The processor 206 of the user equipment 104 computes a shared key $K_0$ as $K_0=H_{[seed]}(MK)=H$ (seed‖MK). As further discussed below, $K_0$ will be used for providing forward secrecy to data locally stored on the user's side. In session setup, $K_0$ is used for computing a response to the server's challenge as $MAC_{K0}$ ('user ok'‖usr‖salt‖seed), which corresponds to the authentication tag of all previously exchanged variables together with a constant string.

6. The response is sent by the transmitter 200 of the user equipment 104 to the receiver 302 of the server 102. The seed is then deleted from the memories 204, 205 of the user equipment 104.

7. The processor 306 of the server 102 computes $K_0$ and verifies if the response provided by the user 104 is valid, which implies that the user equipment 104 was able to recover the value of the seed and, thus, that the user-provided password was correct. In case of success, the processor 306 of the server 102 stores the salt, the seed and MK in memory 304. The salt, the seed and MK are associated with the corresponding user equipment 104. The processor 306 of the server 102 also creates a positive assertion of the form $MAC_{K0}$('serv ok'‖usr‖salt‖seed).

8. The assertion generated in the previous step is sent by the transmitter 300 of the server 102 to the receiver 200 of the user equipment 104.

9. The processor 206 of the user equipment 104 verifies the assertion received using $K_0$ and the value of the seed computed in step 5. If the verification is successful, user equipment 104 and server 102 are mutually authenticated, as both were able to create an authentication tag for fresh random values (the user-provided salt and the server-provided seed). In order to allow future password verifications in an offline manner, the user equipment 104 also locally stores in memory 204 (1) the value of the salt used during the protocol and (2) an authentication token "auth", which can be later compared to a user-provided password. This token could, for example, be computed as $[MAC_{MK}('auth')]_{tlen}$ for a small value of tlen. This allows the system to filter out invalid passwords, except with probability $2^{-tlen}$, which means that users entering an incorrect password will likely be notified of the error, but attackers performing dictionary attacks will not be able to filter out too many wrong guesses.

Note that the above setup procedure creates a session concept, since MK will be unique/fresh in dependence of the salt and $K_0$ will be unique/fresh in dependence of the seed. Therefore, any possible data stored in encrypted form at the user equipment 104 from a previous session cannot be accessed using $K_0$ (or keys derived therefrom). If this would be desirable, the server 102 may keep copies of old seed values. Note that keeping a copy of the seed at the user equipment 104 would result in no forward secrecy properties, as the user equipment 104 would then have the means to generate $K_0$.

Secure Data Storage

After the (online or offline) authentication process, such as the one discussed above, is completed and the master key MK is locally created by the key generator 208 of the user equipment 104 from the user-provided pwd (using the KDF). The key generator 208 of the user equipment 104 and the key generator 308 of the server 102 generate more than one key. In exemplary methods and apparatus, three different keys are generated, each one providing different security/usability tradeoffs. Without loss of generality, a data chunk is defined herein as "protected" when it is both encrypted and authenticated using one of the generated keys. However, it is noted that exemplary methods and apparatus apply in some scenarios that require only one of those processes to be performed (e.g., see discussion below).

No Forward Secrecy Key ($K_{nofs}$)

A $K_{nofs}$ key is computed by the key generators 208, 308 from the master key MK as $K_{nofs}=H(0\|MK)$. The $K_{nofs}$ is stored by the data recorder 212 unchanged in the second memory 205 of the user equipment 104 until a user session is closed. This key can be used by the data encryptor 210 to encrypt data that need to be easily recoverable during a session and that require no forward secrecy. The data recorder 212 stores the encrypted data in memory 204 from where it is continuously available. This allows the processor 206 of the user equipment 104 to decrypt promptly $K_{nofs}$-protected data chunks without re-entering pwd. However, for the same reason, this key is revealed to attackers who might be able to access the memory of the user equipment 104 (e.g., stealing the device while a user session is still open). $K_{nofs}$ should be useful, for example, in data gathering applications that allow users to save any number of partially completed/collected data and come back to them later during the same session. If data chunks protected with this key are delivered to the server, the latter can easily process them by computing the same $K_{nofs}=H(0\|MK)$. In the case of the protocol described above, this only requires the knowledge of pwd and of the salt value used for key derivation. As further discussed below, $K_{nofs}$ is also employed for the encryption of the $K_{sfs}$ key.

Weak (or Partial) Forward Secrecy Key ($K_{wfs}$)

A $K_{wfs}$ key provides partial forward secrecy, in the sense that an attacker who accesses the first memory 204 and/or the second memory 205 of the user equipment 104 while the application is still running is unable to decrypt any $K_{wfs}$-protected data, but it offers no protection against attackers who discover the shared long-term secret (e.g., the user's password or data derived from the user's password). This key is computed by the key generators 208, 308 as $K_{wfs}=H_{[ses]}(MK)=H(ses\|MK)$, where MK is the master key and ses≠0 is a random session identifier generated by the key generator 208 and may be renewed every session (i.e., whenever a user is re-authenticated). The transmitter 200 transmits ses to the server 102. The data encryptor 210 of the user equipment may then encrypt data with $K_{wfs}$ and the data recorder 212 may store the encrypted data in memory 204. After a data chunk is encrypted and authenticated using $K_{wfs}$, this key is replaced by a subsequent $K_{wfs}^{i+1}$ when the key generator 208 hashes it with ses once again, i.e., the system makes $K_{wfs}=H_{[ses]}(K_{wfs})=H(ses\|K_{wfs})$. In other words, the i-th saved data chunk will actually be protected using $K_{wfs}^{ses,i}=H_{[ses]}^{i}(MK)$. The notation "$K_{wfs}^{ses,i}$" is used to denote the i-th $K_{wfs}$ generated during the session identified by sees or that the process of prepending MK with ses and hashing the result is repeated i times. Each chunk is then paired with its corresponding value of ses and i in order to allow its subsequent decryption and verification. The data recorder 212 then stores the subsequent partial forward secrecy key, $K_{wfs}^{i+1}$ in the second memory 205.

As a result, the second memory 205 of the user equipment 104 never holds the key required for decrypting a data chunk protected by $K_{wfs}^{ses,i}$, but only the next, still unused, $K_{wfs}^{ses,i+1}$ key. The $K_{wfs}$ key is useful for protecting consolidated data chunks that might require modification later, but not often. Additionally, the $K_{wfs}$ key is useful for protecting data while a user with a mobile user equipment 104 navigates an area where the risk of theft is high, as a user that steals the user equipment 104 will not be able to access data encrypted with the $K_{wfs}$ key without knowledge of pwd.

Given the values of ses and i, the user can access the encrypted data by providing pwd, which allows the system to compute $K_{wfs}^{ses,i}$ from MK. The server 102 follows an analogous process in order to process data chunks protected in this manner.

It is noted that, as defined herein, both $K_{nofs}$ and $K_{wfs}$ are considered to be limited forward secrecy keys. The term limited forward secrecy key therefore encompasses any key that offers less than perfect (or strong or full) forward secrecy.

Strong (or Full or Perfect) Forward Secrecy Key ($K_{sfs}$)

A $K_{sfs}$ key provides strong (or perfect) forward secrecy. For the avoidance of doubt, as used herein, the terms "strong forward secrecy", "perfect forward secrecy" and "full forward secrecy" encompass situations in which attackers are unable to decrypt any $K_{sfs}$-protected data chunk even if pwd is discovered and/or if the second memory 205 of the device 104 is accessed while the application is still open.

The $K_{sfs}$ key is computed by the key generators 208, 308 as $K_{sfs}=K_0$ after the completion of the setup process and, analogous to $K_{wfs}$, $K_{sfs}$ is replaced by its hash value after being used to protect a data chunk. That is, the data recorder 212 may store $K_{sfs}$ in the second memory 205 until such time as it is used by the data encryptor 210 to encrypt data. After that, the data recorder 212 stores the encrypted data in the first memory 204. The key generator 208 may compute a hash of $K_{sfs}$, which can be stored in the second memory 205 as a subsequent strong forward secrecy key. In other words, the i-th data chunk is protected using $K_{sfs}^i=H^i(K_0)$. Since the user equipment 104 does not store the information (i.e. the seed) required for computing $K_0$, previous values of $K_{sfs}$ cannot be recovered from the device's memory, no matter if the password is known. The subsequent key $K_{sfs}^{i+1}$ is stored by the data recorder 212 in the device's non-volatile memory 205 after usage of $K_{wfs}$ since, unlike $K_{wfs}$, the $K_{sfs}$ key cannot be recomputed otherwise. In methods and apparatus, after the i-th data chunk is encrypted, $K_{sfs}^{i+1}$ may be encrypted with $K_{nofs}$ and then stored. This allows users to use $K_{nofs}$ to recover their next, still unused key $K_{sfs}^{i+1}$ whenever necessary.

The improved security provided by $K_{sfs}$ is counterbalanced by the user's inability to modify the data after it is saved with this key, since the only entity that is able to decrypt and verify forms protected in this manner is the server 102. In order to do so, the data recorder 312 of the server 102 needs to store $K_0$ in the memory 304 and the user's device must associate each data chunk with an identification for $K_0$ (e.g., a session ID in which that key was generated) and a sequence number i that determines how many times $K_0$ must be hashed to obtain the value of $K_{sfs}^i$ employed in the preparation of that chunk of encrypted data.

It should be noted that the notion of perfect forward secrecy used herein is somewhat different from that used in some literature since it only ensures key-security when the user equipment's memory is accessed. Other, known notions of perfect forward secrecy are symmetric since they also ensure security with respect to the server's memory being accessed. That is, if the server uses a process similar to that on the user equipment, e.g., erasing the seed after the PAKE is completed and repeatedly hashing $K_{sfs}$ after it is employed for decryption of chunks (after all, an old $K_{sfs}$ will not be reutilized by the client, so there is no need of storing it or being able to compute it), discovering the server-side $K_{sfs}$ will not disclose an older $K_{sfs}$. Of course, this server-side process might only useful if the encrypted chunks arrive in order, because otherwise the server may be obliged to store a very old $K_{sfs}$ in order to be able to decrypt an old (e.g., delayed) chunk. Further (and possibly similar) mechanisms could, however, be employed on the server side in order to provide a more symmetric perfect forward secrecy.

The properties of the different keys are summarised in the table below.

|  | Property | $K_{nofs}$ | $K_{wfs}$ | $K_{sfs}$ |
|---|---|---|---|---|
| Security | Data secrecy if attackers access volatile memory, but do not discover password | No | Yes | Yes |
|  | Data secrecy if attackers access volatile memory and discover password | No | No | Yes |
|  | Prevents offline dictionary attacks if local data is not stolen | Yes | Yes | Yes |
|  | Prevents offline dictionary attacks even if local data is stolen | No | No | Yes |
|  | Prevents online dictionary attacks against underlying PAKE | No | No | No |
| Usability | Knowledge of password (by legitimate user or attacker) allows recovery of stored data | Yes | Yes | No |
|  | Allows data to be recovered without requiring user to input password | Yes | No | No |
|  | Protected data can be sent to server at any time, without the need of user intervention | Yes | Yes | Yes |

It is desirable for password-based schemes to prevent attackers from easily performing offline dictionary attacks, which are much harder to detect than online dictionary attacks. This is one main motivation of schemes that employ different passwords for authentication toward the server 102 and toward the user equipment(s) 104. In those schemes, it is easier to force an attacker to contact the server 102 when trying to verify the password shared only with this entity. This approach, however, can impair the system's usability, and may even create a false sense of security since users may feel relaxed about choosing similar (if not identical) passwords for different uses.

The methods and apparatus disclosed herein may use a single password while still providing protection against offline dictionary attacks, at least if the strong forward secrecy key is used to encrypt data. Specifically, in order to determine if a guessed password is correct, an attacker would have to (1) run the PAKE protocol and verify if it is successful, or (2) check if the KDF-generated MK can be used to verify the authentication tag of some locally stored, legitimate data. The first case is analogous to an online dictionary attack and can be easily detected by the server 102, which can act accordingly. For example, the server 102 could notify the user and limit the rate of registration attempts using the corresponding username for an arbitrarily large period of time, possibly also holding as suspicious the data provided by that user until further analysis. The second case can be performed offline, but only if there is some locally stored data chunk not protected by the strong forward secrecy mechanism described above. In other words, since the (guessed) master key alone cannot be used to compute any previous $K_{sfs}$, data chunks protected with the $K_{sfs}$ key are useless in offline attacks.

The weak (or partial) forward secrecy mechanism provides, in comparison, a trade-off between security and usability, since it allows a legitimate user to recover data chunks from the device's memory (e.g., a form that was wrongly filled) but provides less protection against dictionary attacks.

Figure 5:
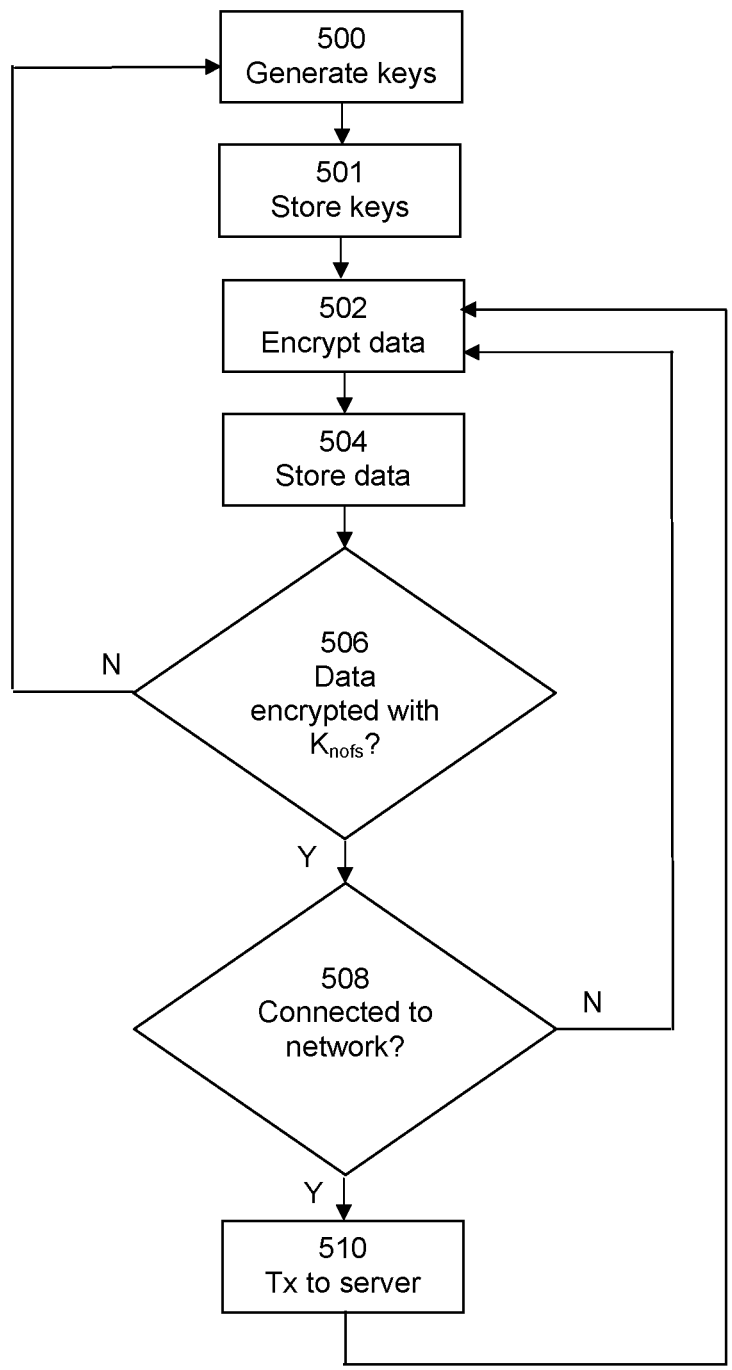
FIG. 5 is a flow diagram of a method of operating a user equipment.

FIG. 5 is a flow diagram showing a method of operation of a user equipment 104 following a successful (online or offline) authentication. The steps shown in FIG. 4 may be carried out before the steps shown in FIG. 5.

The key generator 208 of the user equipment 104 generates 500 two or more keys, as discussed above. The two or more keys comprise at least one perfect forward secrecy key and at least one limited forward secrecy key. In methods and apparatus, the limited forward secrecy key generated by the key generator 208 may comprise a no forward secrecy key and/or a partial (or weak) forward secrecy key.

The data recorder 212 may store 501 the generated keys in the second memory 205.

When data is required to be encrypted, the data encryptor 210 encrypts 502 the data using one of the generated keys. The data may be input by a user. For example, a user may have a mobile user equipment 104 in a field scenario and may be collecting data. The data encryptor 210 may select which key to use to encrypt the data based on a user input. That is, depending on the scenario, a user may select to encrypt the data with any of no forward secrecy, partial forward secrecy and perfect forward secrecy, dependent also on the keys that have been generated. In an exemplary scenario, a user may input data whilst asking a subject a series of questions. During questioning, the data may be saved with no forward secrecy so that the data can easily be edited. After the data has been edited and finalised, it may be encrypted with perfect forward secrecy so that it is fully protected and cannot be accessed by anyone, whether attacker or legitimate user. Alternatively, if the subject does not have all the answers to the questions, but will have more information later, the user may encrypt the collected data with partial forward secrecy, move on to the next subject for questioning and return later to the previous subject. Once the additional information has been collected and questioning is complete, the user may then encrypt the data with perfect forward secrecy.

Once the data has been encrypted, the data recorder 212 stores the data in the first memory 204.

The key generator 208 may determine 506 what key has been used to encrypt the data. For example, if the data was encrypted with no forward secrecy, no subsequent or updated versions of the keys need to be generated. In this case, the transmitter 200 and receiver 202 may determine 508 whether the user equipment 104 is connected to the network and, if so, the transmitter 200 may transmit the stored encrypted data to the server 102. If there is no connection to a network, the method may return to the encryption of more data. It is noted that other methods and apparatus may be configured to transmit data to the server 102 only when a user selects to do so, or alternatively, only when data is consolidated and encrypted and stored with perfect forward secrecy.

If the data is encrypted 502 with either partial or perfect forward secrecy, the key generator 208 may generate subsequent keys, as set out above, which may then be stored 501 in the second memory 205.

Figure 6:
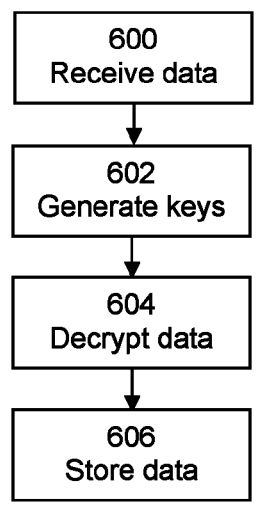
FIG. 6 is a flow diagram of a method of operating a server.

FIG. 6 is a flow diagram showing a method of operation of a server 102 following a successful (online or offline) authentication. The steps shown in FIG. 4 may be carried out before the steps shown in FIG. 5.

The receiver 302 receives 600 data from the user equipment 104. The data has been encrypted with one of a plurality of keys generated by the key generator 208 of the user equipment 104. The plurality of keys comprises at least one perfect forward secrecy key and at least one limited forward secrecy key.

In addition to the encrypted data, the receiver 302 may also receive a session identifier value, ses, and/or an index, i, denoting the number of hashes required to generate one of a partial forward secrecy key and a perfect forward secrecy key.

The key generator 308 generates 602 one or more keys, as set out above. This may be done by hashing a value that is based on the shared secret a number of times indicated by i. The generated keys may be stored in memory 304 by the data recorder 312.

The data decryptor 310 decrypts 604 the encrypted data using one of the generated keys. The encrypted data may comprise encrypted payload data and also encrypted other data necessary, for example, to transmit the payload data to the server 102. In exemplary methods and apparatus, the other data may comprise meta data. The data recorder 312 then stores at least part of the decrypted data in the memory 304. The at least part of the decrypted data may comprise the payload data.

Depending on the client's specific requirements, only a subset of the discussed keys needs to be created and used. For instance, in a scenario where consolidated data chunks are not expected to be modified, but rather replaced by new ones, $K_{sfs}$ might be used for protecting all chunks to be delivered to the server; meanwhile $K_{nofs}$ could be used only for auxiliary processes (e.g., encrypting $K_{sfs}$) and for encrypting non-consolidated chunks, but not for authenticating them since they will never leave the user equipment 104. In this setting, offline dictionary attacks could become much harder to succeed due to the lack of locally available information (authentication tags) for filtering wrong guesses. Alternatively, exemplary methods and apparatus may provide only the $K_{sfs}$ and $K_{wfs}$ keys. In another example, when modifications to consolidated data chunks are frequent, usability concerns may lead to the need of employing $K_{nofs}$ in the protection of all data.

One exemplary application of the methods and apparatus disclosed refers to data collection applications deployed in remote areas and involving sensitive information (e.g., for (public) health survey and surveillance). In particular, the recording of medical patient data in such remote areas. Such applications may involve standardized forms filled out by data collection agents using mobile devices, such as smartphones. After they are completed, the forms are then delivered (e.g., via a wireless network, such as 3G) to a server. In this scenario, partially filled forms can be encrypted using $K_{nofs}$, since they may require repeated access by the agents before all of the data is collected and they can be consolidated. When an agent has completed a form, it can be consolidated and may be saved using $K_{wfs}$. This allows the agents to come back to them later and edit some information before effectively delivering the gathered data. Alternatively, and for higher security, consolidated forms could be saved with $K_{sfs}$ and automatically sent to the server as soon as a communication channel becomes available. In this latter case, $K_{sfs}$ may be a more logical choice because the forms are not expected to be modified before being delivered to the server.

Another exemplary use for the methods and apparatus disclosed is disk encryption for laptops. According to policy at many companies, laptops used during travel must use some form of disk encryption, protecting intellectual property and trade/business secret stored on the disk. Typically, disk encryption provides no forward security at all. In fact, even if the password is changed, the actual key used to encrypt the files remain the same. Also, this solution does not provide any means to protect data transferred to/from the device.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A user equipment that encrypts and stores data to communicate to a server of a communication network, the user equipment comprising:
    a processor coupled to a first memory and configured to:
        establish a session between the user equipment and the server of the communication network;
        generate two or more keys based on a shared secret made available to the user equipment and the server, wherein the two or more keys comprise at least one perfect forward secrecy key, and at least one partial forward secrecy key, wherein the at least one partial forward secrecy key is generated based on a cryptographic function applied to the shared secret and a session identifier associated with the established session;
        encrypt data using the at least one partial forward secrecy key;
        store the encrypted data in the first memory of the user equipment;
        generate an updated partial forward secrecy key based on an application of a one-way function to the partial forward secrecy key and the session identifier responsive to the encryption of the data using the at least one partial forward secrecy key; and
        store the updated partial forward secrecy key in a second memory of the user equipment to encrypt future communications during the established session with the server; and
    a transmitter configured to transmit the stored encrypted data in a communication to the server during the established session.

2. The user equipment according to claim 1, wherein the processor is configured to generate a master key based on the shared secret.

3. The user equipment according to claim 2, wherein the processor is further configured to generate a salt, and to generate the master key based on the shared secret and the salt.

4. The user equipment according to claim 2, wherein the processor is configured to generate the partial forward secrecy key based on a one-way function of the master key and the session identifier.

5. The user equipment according to claim 4, wherein the processor is configured to generate the session identifier.

6. The user equipment according to claim 2, wherein the processor is further configured to generate a salt, and to generate the master key based on the shared secret and the salt, and wherein the transmitter is further configured to transmit the salt to the server.

7. The user equipment according to claim 2, wherein the processor is configured to generate the at least one partial forward secrecy key based on a one-way function of the master key and the session identifier, and wherein the transmitter is further configured to transmit the session identifier to the server.

8. The user equipment according to claim 1, wherein processor is configured to select at least one of the two or more keys to encrypt the data based on a user input.

9. A method performed by a user equipment operable to communicate with a server of a communication network, the method comprising:
   establishing a session between the user equipment and the server of the communication network;
   generating, two or more keys based on a shared secret made available to the user equipment and the server, wherein the two or more keys comprise at least one perfect forward secrecy key, and at least one partial forward secrecy key, wherein the at least one partial forward secrecy key is generated based on a cryptographic function applied to the shared secret and a session identifier associated with the established session;
   encrypting data using the at least one partial forward secrecy key;
   storing the encrypted data in a first memory of the user equipment;
   generating an updated partial forward secrecy key based on an application of a one-way function to the partial forward secrecy key and the session identifier responsive to the encryption of the data using the at least one partial forward secrecy key;
   storing the updated partial forward secrecy key in a second memory of the user equipment to encrypt future communications during the established session with the server; and
   transmitting the stored encrypted data in a communication to the server during the established session.

10. A computer program product comprising a non-transitory computer readable storage medium storing code configured, when executed by a computer, to carry out the method according to claim 9.

11. A server in communication with a user equipment operating in a communication network, the server comprising:
   a receiver configured to receive encrypted data in a communication from the user equipment;
   a processor and memory, the processor configured to:
      establish a session between the user equipment and the server;
      generate two or more keys based on a shared secret made available to the user equipment and the server, wherein the two or more keys comprise at least one perfect forward secrecy key, and at least one partial forward secrecy key, wherein the at least one partial forward secrecy key is generated based on a cryptographic function applied to the shared secret and a session identifier associated with the established session;
      decrypt the received encrypted data using the at least one partial forward secrecy key;
      store at least part of the decrypted data in the memory;
      generate an updated partial forward secrecy key based on an application of a one-way function to the partial forward secrecy key and the session identifier responsive to the decryption of the data using the at least one partial forward secrecy key; and
      store the updated partial forward secrecy key in the memory to decrypt future communications from the user equipment during the established session.

12. The server according to claim 11, wherein the processor is configured to generate a master key based on the shared secret, and wherein the key generator is further configured to generate the at least one perfect forward secrecy key by applying a one-way function on the master key and a seed value generated by the server.

13. The server according to claim 12, wherein the processor is configured to delete the seed value from the memory after the perfect forward secrecy key has been generated.

14. A method performed by a server in communication with a user equipment operating in a communication network, the method comprising:
   establishing a session between the user equipment and the server;
   receiving encrypted data in the established session from the user equipment;
   generating two or more keys based on a shared secret made available to the user equipment and the server, wherein the two or more keys comprise at least one perfect forward secrecy key, and at least one partial forward secrecy key, wherein the at least one partial forward secrecy key is generated based on a cryptographic function applied to the shared secret and a session identifier associated with the established session;
   decrypting the received encrypted data using the at least one partial forward secrecy key;
   storing the decrypted data in a memory of the server;
   generating an updated partial forward secrecy key based on an application of a one-way function to the partial forward secrecy key and the session identifier responsive to the decryption of the data using the at least one partial forward secrecy key; and
   storing the updated partial forward secrecy key in the memory to decrypt future communications from the user equipment during the established session with.

15. A computer program product comprising a non-transitory computer readable storage medium storing code configured, when executed by a computer, to carry out the method according to claim 14.

* * * * *